US011747188B2

(12) United States Patent  
Hirose et al.

(10) Patent No.: US 11,747,188 B2
(45) Date of Patent: Sep. 5, 2023

(54) LIQUID LEVEL DETECTOR SUPPORT MADE OF METAL

(71) Applicant: Yazaki Corporation, Tokyo (JP)

(72) Inventors: Ryo Hirose, Shizuoka (JP); Shintaro Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 75 days.

(21) Appl. No.: 17/497,163

(22) Filed: Oct. 8, 2021

(65) Prior Publication Data

US 2022/0113179 A1 Apr. 14, 2022

(30) Foreign Application Priority Data

Oct. 12, 2020 (JP) .................................. 2020-171904

(51) Int. Cl.
*G01F 23/38* (2006.01)
(52) U.S. Cl.
CPC .................................... *G01F 23/38* (2013.01)
(58) Field of Classification Search
CPC ...................................................... G01F 23/38
See application file for complete search history.

(56) References Cited

U.S. PATENT DOCUMENTS

| 9,677,926 | B2* | 6/2017 | Terada | G01F 23/32 |
| 9,766,111 | B2* | 9/2017 | Isobe | G01F 23/38 |
| 10,648,848 | B2* | 5/2020 | Hirose | G01F 23/38 |
| 11,150,124 | B2* | 10/2021 | Kato | G01F 23/38 |
| 2011/0036165 | A1* | 2/2011 | Fukuhara | G01F 23/38 73/317 |
| 2012/0174667 | A1* | 7/2012 | Miyagawa | G01F 23/36 73/304 R |
| 2019/0360852 | A1* | 11/2019 | Ichisawa | G01F 23/38 |
| 2020/0256719 | A1 | 8/2020 | Kato et al. | |

FOREIGN PATENT DOCUMENTS

| JP | 10-64303 A | 3/1998 |
| JP | 2013-178141 A | 9/2013 |
| JP | 2014-137271 A | 7/2014 |
| JP | 2018205299 A | * 12/2018 ......... F02M 37/0082 |
| JP | 2020-128966 A | 8/2020 |

* cited by examiner

*Primary Examiner* — John Fitzgerald
(74) *Attorney, Agent, or Firm* — Sughrue Mion, PLLC (57) ABSTRACT

A liquid-level-detector support made of metal includes a support body engaged with a thickness-direction first portion of the liquid level detector and a fixing portion provided in the support body configured to fix the liquid level detector to the support body.

4 Claims, 9 Drawing Sheets

LIQUID LEVEL DETECTOR SUPPORT MADE OF METAL

CROSS-REFERENCE TO RELATED APPLICATIONS

The present application is based on, and claims priority from the prior Japanese Patent Application No. 2020-171904, filed on Oct. 12, 2020, the entire contents of which are incorporated herein by reference.

TECHNICAL FIELD

The present disclosure relates to a liquid level detector support made of metal.

BACKGROUND

The fuel level sensor (liquid level detector) is roughly classified into two types: a type mounted on a mounting stay (liquid level detector support) and a type mounted on a pump.

With regard to the installation of the fuel level sensor, the following requirements are required. The first requirement is to minimize rattling in the assembled state. This is because a detection accuracy of a liquid surface is better when there is no rattling. The second requirement is good assemblability. Since the fuel level sensor is generally assembled by hand, if the assemblability is poor, defective processes such as half-fitting may occur.

In the type mounted on a pump, since a material of the mounting part is resin, the above two requirements can be made compatible. In contrast, in the type mounted to a mounting stay, the material of the mounting stay may be metal.

A conventional metal mounting stay includes a support body and a pair of protrusions provided on the support body (see JP 2013-178141 A). In a conventional metal mourning stay, the liquid level detector is simultaneously held in the width direction and the thickness direction by the support body and the pair of protrusions. Thus, the liquid level detector is installed in a state where the metal mounting stay is not rattled.

SUMMARY

By the way, the conventional metal mounting stays are made of metal, and therefore have high rigidity. As a result, the mounting load of the liquid level detector increases, and the good assembling property, which is the second requirement, may be impaired.

For this reason, a configuration allowing some rattling is conceivable. In other words, it is conceivable that the liquid level detector is installed with some looseness to the metal mounting stay.

This rattling makes it possible to reduce the force to be applied when the liquid level detector is installed onto the metal mounting stay. However, by providing this rattling, the first requirement cannot be satisfied, and the detection accuracy of the liquid level detector may deteriorate.

An object of the present disclosure is to provide a liquid level detector support made of metal, which can improve assemblability when assembling the liquid level detector to a support made of metal, while securing fixing strength of the liquid level detector being assembled.

A liquid level detector support made of metal according to some embodiments includes a support body configured to engage with a thickness-direction first portion arranged on a first side in the thickness direction of the liquid level detector; a thickness-direction fixing portion projecting from the support body and configured to engage with a thickness-direction second portion arranged on a second side in the thickness direction of the liquid level detector, thereby configured to fix the liquid level detector in the thickness direction in cooperation with the support body; a first widthwise-fixing portion projecting from the support body apart from the thickness-direction fixing portion and configured to engage with a widthwise first portion arranged on a first side in the widthwise direction of the liquid level detector; and a second widthwise-fixing portion projecting from the support body apart from the thickness-direction fixing portion and arranged on the opposite side with respect to the first widthwise fixing portion and configured to engage with a widthwise second portion arranged on a second side in the widthwise direction of the liquid level detector thereby configured to fix the liquid level detector in the widthwise direction in cooperation with the first widthwise-fixing portion.

At least one of the thickness-direction fixing portion, the first widthwise-fixing portion, and the second widthwise-fixing portion may have a cutout formed therein.

The thickness-direction fixing portion may be configured to abut on the liquid level detector in a state the liquid level detector is fixed by the first widthwise fixing portion and the second widthwise fixing portion and when the liquid level detector is inclined at a predetermined angle in the width direction.

The support body may include a protective portion configured to prevent the liquid level detector from colliding with an edge of an opening part of a tank when installing the liquid level detector into the tank.

A liquid level detector support made of metal according to some embodiments includes a support body, a thickness-direction fixing portion provided in the support body and configured to fix the liquid level detector to the support body in a thickness direction of the liquid level detector; and a widthwise-fixing portion provided in the support body separately from the thickness-direction fixing portion and configured to fix the liquid level detector to the support body in a widthwise direction of the liquid level detector.

A liquid level detector support made of metal according to some embodiments includes a support body and a fixing portion provided in the support body and a cutout is formed in the fixing portion and configured to fix the liquid level detector to the support body.

According to the above described configurations, it is possible to provide a liquid level detector support made of metal, which can improve the assemblability when assembling the liquid level detector to a support made of metal, while securing fixing strength of the liquid level detector being assembled.

DETAILED DESCRIPTION

Various embodiments will be described hereinafter with reference to the accompanying drawings.

Figure 1:
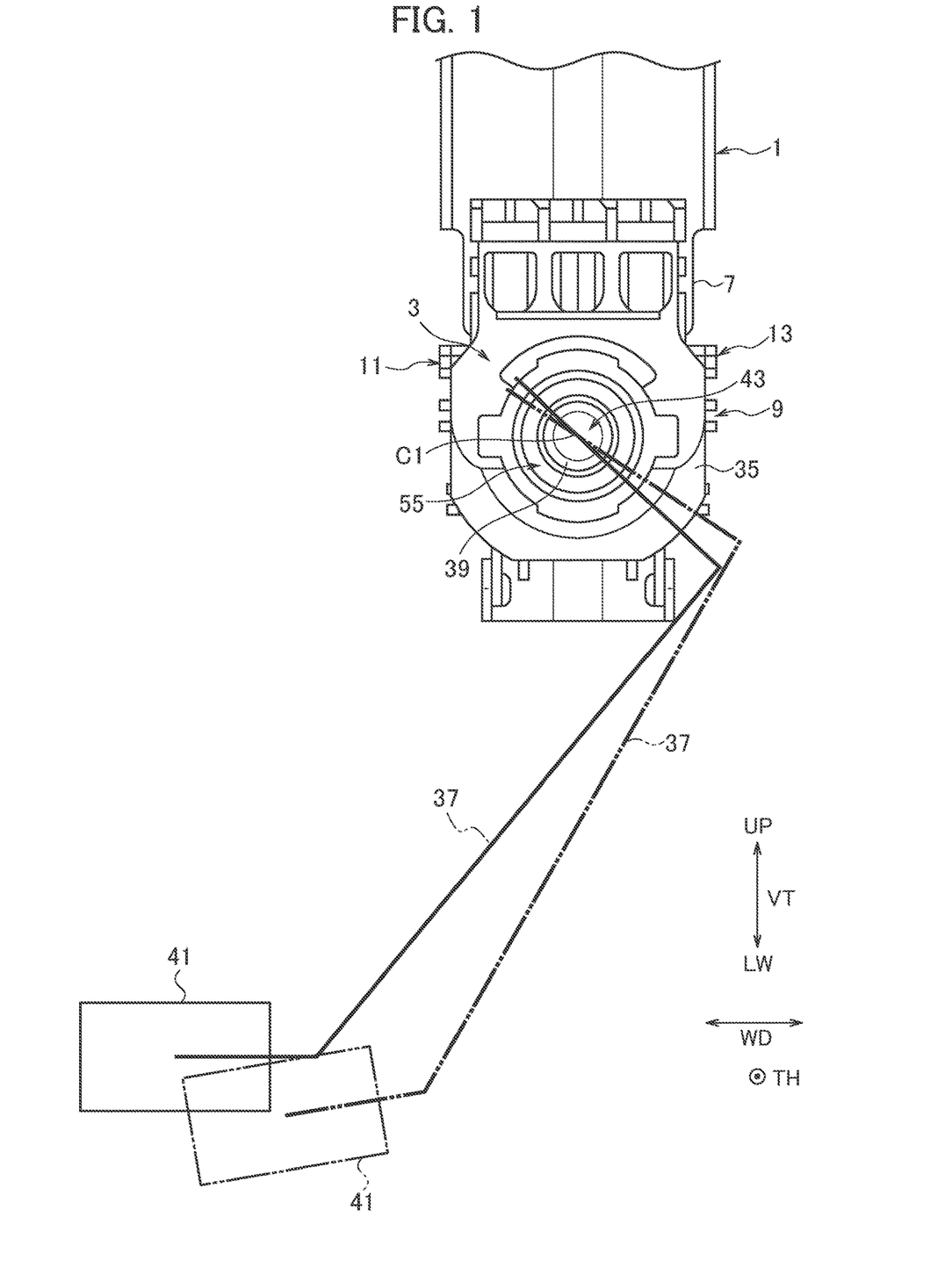
FIG. 1 is a front view of a liquid level detector support made of metal according to some embodiments and a liquid level detector mounted on the liquid level detector support.

As illustrated in FIG. 1, a liquid level detector (liquid level sensor) 3 is mounted on a liquid level detector support made of metal (metal mounting stay) 1 according to embodiments of this disclosure. The liquid level detector support 1 made of metal on which the liquid level detector 3 is mounted is installed in a tank, for example, a fuel tank 5 of a vehicle illustrated in FIG. 4. Since the liquid level detector 3 is installed in the tank 5, the liquid level detector 3 detects liquid level (the height of liquid surface) of liquid fuel in the tank 5. Hereinafter, the liquid level detector support 1 made of metal may be simply referred to as "liquid level detector support 1".

Figure 2:
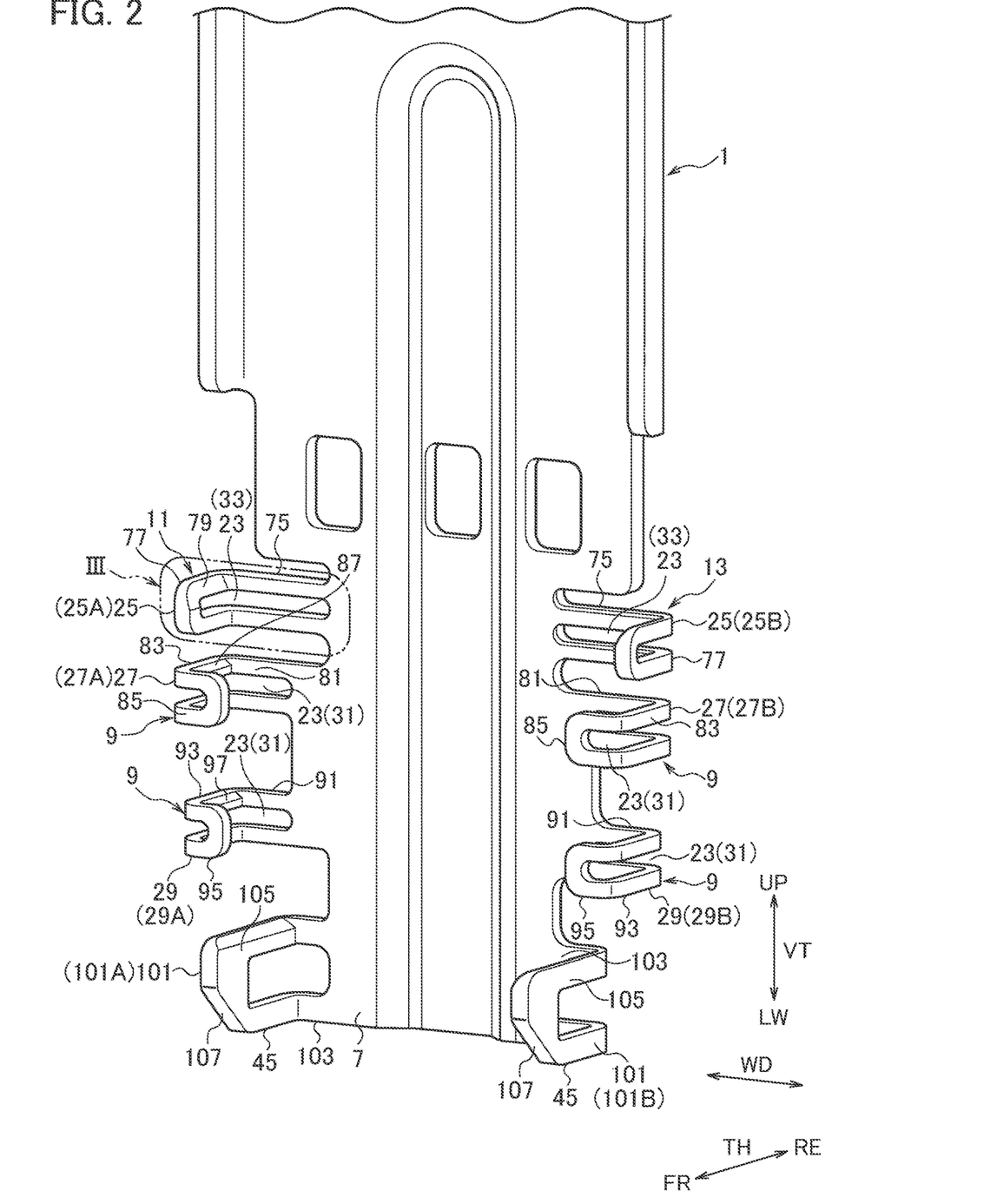
FIG. 2 is a perspective view of a substantial portion of a liquid level detector support made of metal according to some embodiments.
Figure 9:
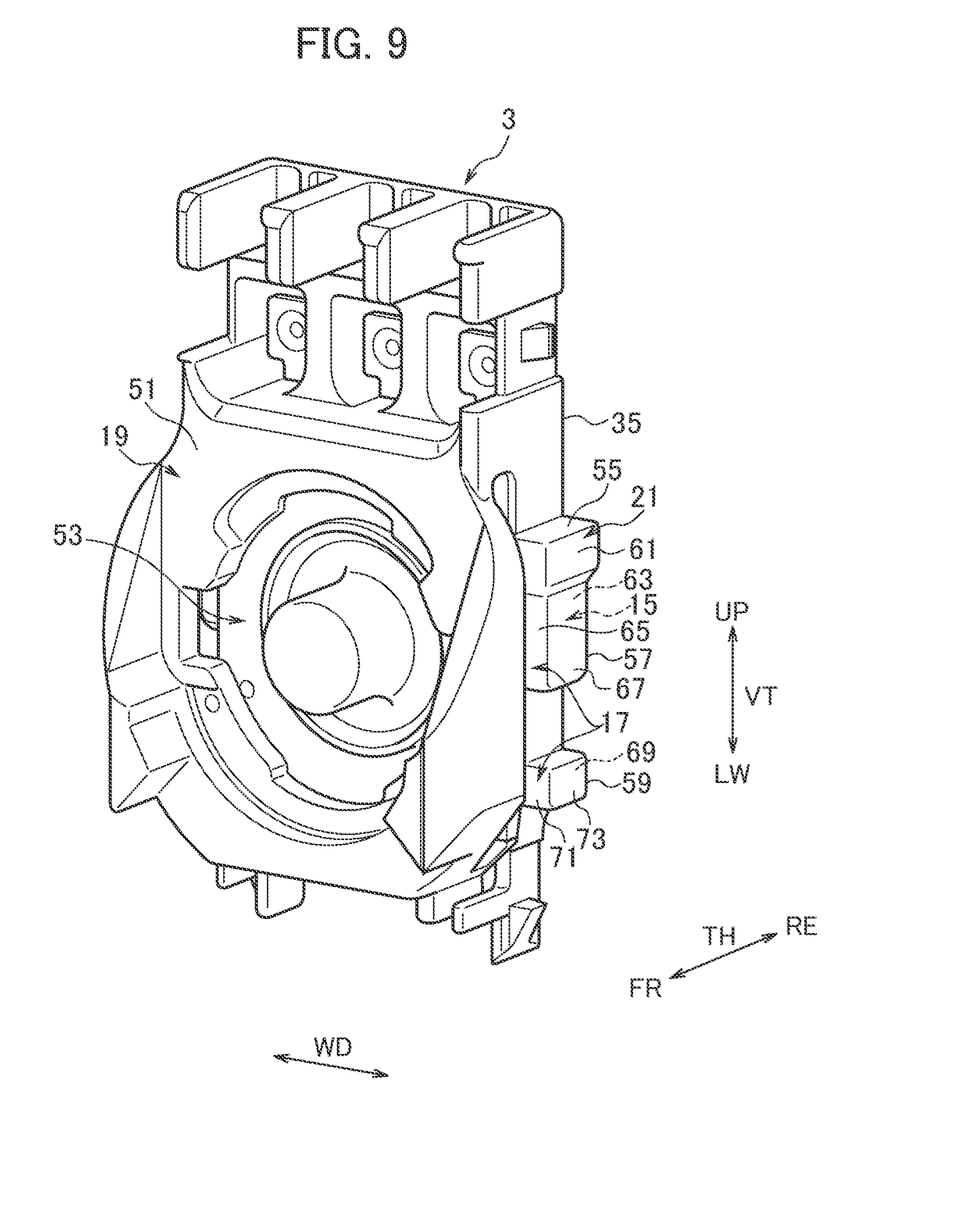
FIG. 9 is a perspective view of a housing of a liquid level detector.

Here, as illustrated in FIGS. 1, 2, and 9, a predetermined direction in the liquid level detector 3 and the liquid level detector support 1 is defined as a thickness direction TH. A predetermined direction orthogonal to the thickness direction TH is defined as a width direction WD. A direction orthogonal to the thickness direction TH and the width direction WD is defined as a vertical direction VT.

As illustrated in FIG. 2 and the like, the liquid level detector support 1 includes a support body 7, a thickness-direction fixing portion 9, a first widthwise fixing portion 11, and a second widthwise fixing portion 13.

Figure 5A:
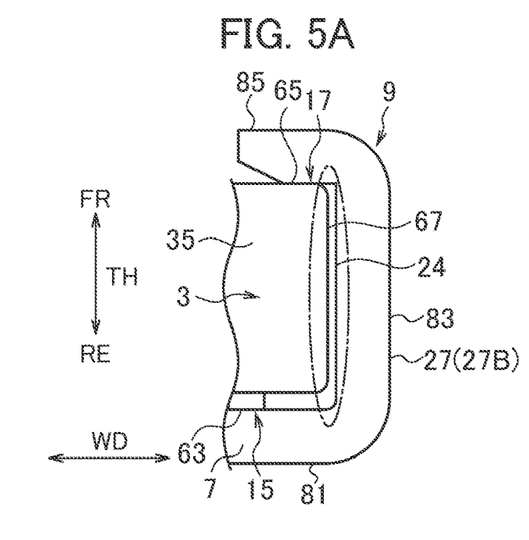
FIG. 5A is a diagram illustrating an engagement state between a thickness-direction fixing portion of a liquid level detector support made of metal according to some embodiments and a liquid level detector.
Figure 5B:
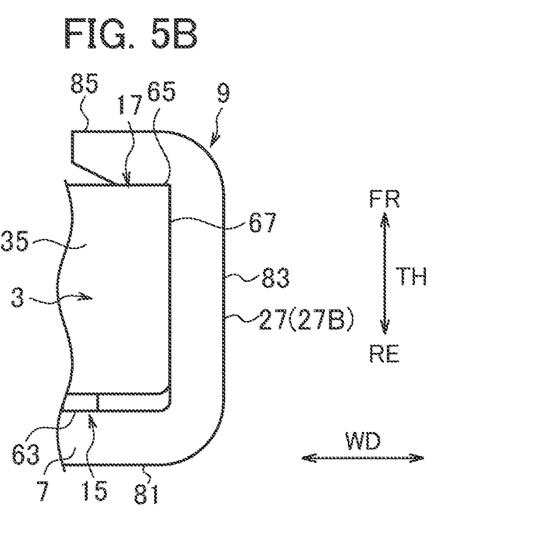
FIG. 5B is a diagram illustrating a state in which the thickness direction fixing portion 9 abutting against the liquid level detector 3 due to inclination of the liquid level detector 3 by a predetermined slight angle around an axis extending in the thickness direction with respect to the liquid level detector support 1 from the state illustrated in FIG. 5A.

The support body 7 is engaged with a thickness-direction first portion 15 in the thickness direction TH, which is a portion on one side in the thickness direction TH of the liquid level detector 3 (See FIGS. 5 and 9). For example, the support body 7 contacts the thickness-direction first portion 15 in the thickness direction TH, which is a part of the surface (rear RE side surface) on one side in the thickness direction of the liquid level detector 3.

As illustrated in FIG. 5 and the like, the thickness-direction fixing portion 9 projects from the support body 7. The thickness-direction fixing portion 9 engages with a thickness-direction second portion 17 in the thickness direction which is a part on the other side in the thickness direction of the liquid level detector 3. The thickness-direction fixing portion 9 holds the liquid level detector 3 in cooperation with the support body 7, and fixes the liquid level detector 3 in the thickness direction. For example, the thickness-direction fixing portion 9 abuts on the thickness-direction second portion 17 which is a part of the other side surface of the liquid level detector 3 in the thickness direction. The thickness-direction fixing portion 9 cooperates with the support body 7 to sandwiches the liquid level detector 3 with an urging force, for example, and positions and fixes the liquid level detector 3 to the support body 7 in the thickness direction.

As illustrated in FIG. 2 and the like, the first widthwise fixing, portion 11 is apart from the thickness-direction fixing portion 9 and protrudes from the support body 7 separately from the thickness-direction fixing portion 9. The first widthwise fixing portion 11 is configured to engage with the widthwise first portion 19, which is a portion on one side in the width direction WD of the liquid level detector illustrated in FIG. 9. For example, the first widthwise fixing portion 11 is brought into contact with the widthwise first portion 19 which is a portion of a surface on the one side in the width direction WD of the liquid level detector 3.

The second widthwise fixing portion 13 is apart from the thickness-direction fixing portion 9 and the first widthwise fixing portion 11, and protrudes from the support body 7 on the opposite side to the first widthwise fixing portion 11 separately from the thickness-direction fixing portion 9 and the first widthwise fixing portion 11. That is, the second widthwise fixing portion 13 projects from the support body 7 on the side opposite to the first widthwise fixing portion 11 in the width direction with the support body 7 therebetween.

The second widthwise fixing portion 13 is configured to fix the liquid level detector 3 in the width direction WD in cooperation with the first widthwise fixing portion 11 by engaging with a widthwise second portion 21, which is a part on the other side in the width direction WD of the liquid level detector 3. For example, the second widthwise fixing portion 13 abuts on the widthwise second portion 21 in the width direction WD which is a part of the other side surface in the width direction. In cooperation with the first widthwise fixing portion 11, the liquid level detector 3 is held by an urging force, for example, and the liquid level detector 3 is positioned and fixed to the support body 7 in the width direction WD.

Figures 6A, 6B, 6C, 6D:
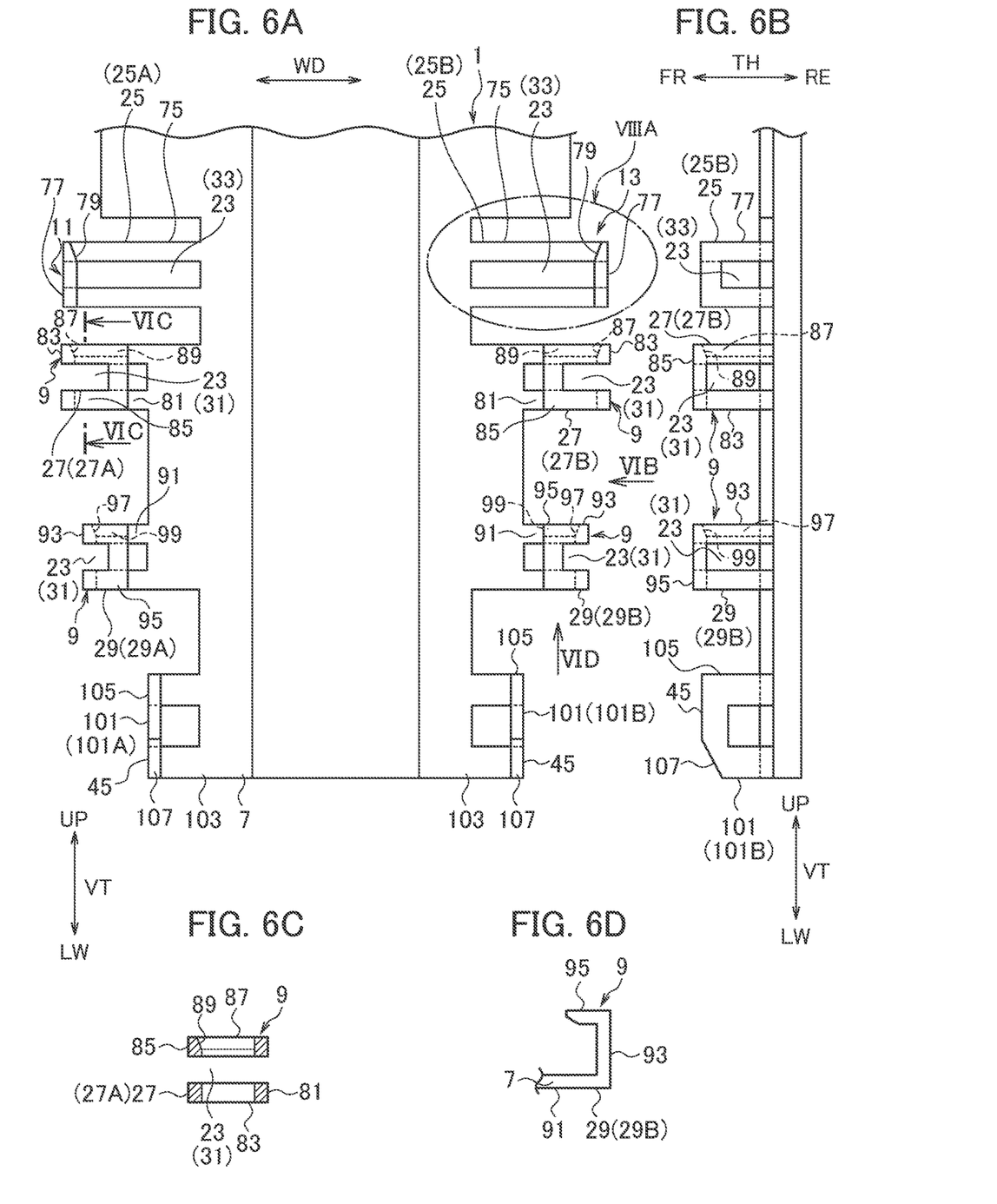
FIG. 6A illustrates a simplified configuration of a part of a liquid level detector support made of metal according to some embodiments.
FIG. 6B is an arrow view of VIB in FIG. 6A.
FIG. 6C is a diagram illustrating a VIC-VIC cross section in FIG. 6A.
FIG. 6D is an arrow view of VID in FIG. 6A.

The liquid level detector support 1 is formed by bending a plate-like metal material (semi finished product) having a predetermined shape when viewed in the thickness direction. Further, as illustrated in FIG. 6A, the liquid level detector support 1 has a shape orthogonal to the width direction WD and symmetrical with respect to a plane including the center of the liquid level detector support 1. Thus, the first widthwise fixing portion 11 and the second widthwise fixing portion 13 are opposed to each other in the width direction WD.

Cutouts 23 configured to reduce and adjust the rigidity of the fixing portions 9, 11, 13 are provided in the thickness-direction fixing portion 9, the first widthwise fixing portion 11, and the second widthwise fixing portion 13 of the liquid level detector support 1. The cutout 23 is formed in an elongated shape, for example. It is not necessary to form the cutouts 23 for all of the thickness direction fixing portion 9, the first widthwise fixing portion 11, and the second widthwise fixing portion 13. The cutout 23 may be provided in at least one of the thickness direction fixing portion 9, the first widthwise fixing portion 11, and the second widthwise fixing portion 13.

In the liquid level detector support 1, a liquid level detector 3 is mounted on the liquid level detector support 1. In a state where the liquid level detector 3 is fixed in the width direction WD by the first widthwise fixing portion 11 and the second widthwise fixing portion 13, the liquid level detector 3 is also fixed to the liquid level detector support 1 in the width direction WD by the thickness-direction fixing portion 9.

Even in a state where the liquid level detector 3 is mounted on the liquid level detector support 1, the liquid level detector 3 may be inclined at a predetermined slight angle with respect to the support body 7 in the width direction WD (around an axis extending in the thickness direction). When this inclination occurs (when the posture of the liquid level detector 3 slightly changes), the thickness-direction fixing portion 9 is configured to abut on the liquid level detector 3 together with, for example, the first widthwise fixing portion 11 and the second widthwise fixing portion 13.

More specifically, in a state in which a slight inclination of the liquid level detector 3 is not generated, as illustrated in FIG. 5A, a slight gap 24 may exist between the liquid level detector 3 and the thickness direction fixing portion 9.

In a state illustrated in FIG. 5A, when the liquid level detector 3 is inclined by a predetermined slight angle around an axis extending in the thickness direction with respect to the liquid level detector support 1, the thickness direction fixing portion 9 abuts on the liquid level detector 3 and the gap 24 disappears, as illustrated in FIG. 5B. Thus, a rotation angle of the liquid level detector 3 with respect to the liquid level detector support 1 is prevented from being larger than the predetermined slight angle.

As illustrated in FIG. 2 and the like, the widthwise fixing portions 11 and 13 includes a pair of protrusions 25, the pair of protrusions 25 protruding from the support body 7 in the width direction WD and arranged at both end of the width direction WD of the support body 7. The first widthwise fixing portion 11 includes one protrusion 25A protruding from one end of the support body 7 in the width direction WD toward one side of the support body 7. The second widthwise fixing portion 13 includes one protrusion 25B protruding from the other end of the support body 7 in the width direction WD toward the other side of the support body 7.

The thickness-direction fixing part 9 includes two pairs of protrusions 27, 29, each pair of protrusions 27, 29 protruding from the support body 7 in the width direction WD and arranged at both end of the width direction of the support body 7. Specifically, the thickness-direction fixing portion 9 includes two protrusions 27A, 29A protruding from one end in the width direction of the support body 7 toward one side. These two protrusions 27A and 29A are separated from each other in the vertical direction VT. Further, these two protrusions 27A and 29A are separated from the protrusions 25A in the vertical direction VT.

The thickness-direction fixing portion 9 includes two protrusions 27B, 29B protruding from the other end in the width direction of the support body 7 toward the other side. These two protrusions 27B and 29B are also separated from each other. Further, these two protrusions 27B, 29B are also separated from the protrusion 25B.

The thickness direction fixing portion 9, the first widthwise fixing portion 11, and the second widthwise fixing portion 13 are formed in a plate shape as illustrated in FIG. 2 and the like. However, the first widthwise fixing portion 11 and the second widthwise fixing portion 13 are in a state in which a flat plate having a predetermined shape is bent at a predetermined portion.

For example, the protrusion 25A protrusion of the first widthwise fixing portion 11 is formed of two flat plate-like portions having a predetermined shape. The protrusion 25B protrusion of the second widthwise fixing portion 13 is also formed of two flat plate-like portions having a predetermined shape.

The protrusion 27A of the thickness-direction fixing portion 9 is formed of three flat plate-like portions having a predetermined shape. The protrusion 27B of the thickness-direction fixing portion 9 is also formed of three flat plate-like portions having a predetermined shape. The protrusion 29A of the thickness-direction fixing portion 9 is also formed of three flat plate-like portions having a predetermined shape. The protrusion 29B of the thickness-direction fixing portion 9 is also formed of three flat plate-like portions having a predetermined shape.

The cutout 23 of the thickness-direction fixing portion 9 is separated from an end surface (End surfaces of the protrusions 27, 29 when viewed in the thickness direction) of the thickness-direction fixing portion 9 formed in a plate shape. That is, the cutout 23 of the thickness-direction fixing portion 9 is formed by a through-hole 31 having elongated shape and penetrating each of the protrusions 27A, 27B, 29A, 29B in the thickness direction. The cutout 23 formed of the through-hole 31 is not communicate with the outer peripheral edges of the protrusions 27A, 278, 29A, 29B, but is separated from the outer peripheral edges of the protrusions 27A, 27B, 29A, 29B.

The cutout 23 of the first widthwise fixing portion 11 is also separated from an end face tan end face when viewed in the thickness direction) of the first widthwise fixing portion 11 formed in a plate shape. That is, the cutout 23 of the first widthwise fixing portion 11 is formed by a through-hole 33 having elongated shape and penetrating the protrusion 25A in the thickness direction.

A cutout 23 of the second widthwise fixing portion 13 is also separated from an end face (an end face when viewed in the thickness direction) of the second widthwise fixing portion 13 formed in a plate shape. That is, the cutout 23 of the second widthwise fixing portion 13 is formed by the through-hole 33 penetrating h the protrusion 25B in the thickness direction.

As illustrated in FIG. 1, the liquid level detector 3 includes a housing 35, a float arm 37, a holder 39, and a float 41. The holder 39 is rotatably supported (installed) on the housing 35. The holder 39 is provided with a float arm mounting part 43 configured to mount the float arm 37. The housing 35 may be a chassis, a frame, or the like. The holder 39 may be referred to as a rotation member or the like.

The base end of the float arm 37 is installed integrally with the holder 39. A float 41 is mounted at the tip of the float arm 37. The float 41 is separated from the holder 39.

The housing 35 is provided with, for example, a Hall IC (IC is an integrated circuit) (not illustrated). The holder 39 is provided with a magnet (not illustrated). The liquid level detector 3 detects the liquid level (level of liquid surface) of the fuel by detecting the rotation of the holder 39, to which the float 41 is connected, with respect to the housing 35 by buoyancy received by the float 41 from the fuel in the tank 5.

The support body 7 is formed in a plate shape. The thickness direction of the support body 7, the thickness direction of the liquid level detector 3, and the extension direction of the rotation shaft C1 of the holder 39 with respect to the housing 35 coincide with each other. When viewed in the thickness direction of the support body 7 (when viewed from the front FR side), as illustrated in FIG. 1, the position of the rotation axis C1 of the holder 39 with respect to the housing 35 in the width direction WD and the position of the center of the support body 7 in the width direction coincide with each other.

When viewed in the thickness direction of the support body 7, in the width direction WD, the rotation axis C1 of the holder 39 is positioned in the center between the left protrusion 27A (29A) of the thickness direction fixing portion 9 and the right protrusion 27B (29B) of the thickness direction fixing portion 9. The center between the left protrusion 27A (29A) and the right protrusion 27B (29B) is a part of the support body 7 located at the center of the left protrusion 27A (29A) and the right protrusion 27B (29B).

When viewed in the thickness direction of the support body 7, in the vertical direction VT, the rotation axis C1 of the holder 39 with respect to the housing 35 is positioned at the center of the support body 7 between the upper protrusions 27A, 27B and the lower protrusions 29A, 29B of the thickness-direction fixing portion 9.

In the above description, the positional relationship between the protrusions 27 and 29 of the thickness-direction fixing portion 9 and the rotation axis C1 of the holder 39 when viewed in the thickness-direction of the support body 7 is described. However, the protrusions 27 and 29 of the thickness-direction fixing portion 9 and the protrusions 25 of the widthwise fixing portions 11 and 13 may be replaced appropriately, in the above description.

The liquid level detector 3 is configured to mount integrally on the liquid level detector support 1 by moving the liquid level detector 3 in a predetermined one direction in the vertical direction VT perpendicular to the thickness direction and the width direction WD, in this embodiment, in a direction from the upper UP Side to the lower LW side.

As illustrated in FIG. 2 and the like, the liquid level detector support 1 is provided with a protective portion (protective wall) 45 protruding from the support body 7. The protective portion 45 is provided in order to prevent the liquid level detector 3 from colliding with an edge 49 of an opening part (insertion port) 47 of the tank 5 when the liquid level detector support 1 and the liquid level detector 3 are installed in the tank 5 in the state that the liquid level detector 3 is mounted on the liquid level detector support 1.

Here, the liquid level detector 3 and the liquid level detector support 1 will be described in more detail.

The housing 35 of the liquid level detector 3 is integrally molded of resin, for example. The housing 35 of the liquid level detector 3 directly engages with the liquid level detector support 1, whereby the liquid level detector 3 is integrally mounted on the liquid level detector support 1.

Further, the liquid level detector support 1 on which the liquid level detector 3 is mounted directly engages with the tank 5, whereby the liquid level detector 3 is installed in the tank 5. In a state where the liquid level detector support 1 in which the liquid level detector 3 is mounted is installed in the tank 5 (liquid level detector installation completion state), the liquid level detector support 1, the housing 35 of the liquid level detector 3 and the tank 5 are integrated.

In the liquid level detector installation completion state, as illustrated in FIG. 1, the float arm 37 and the holder 39 rotate relative to the housing 35 of the liquid level detector 3 by the buoyancy received by the float 41 from the fuel. The liquid level in the tank 5 is detected by the rotation of the holder 39 with respect to the housing 35.

As illustrated in FIG. 9, the housing 35 of the liquid level detector 3 includes a housing body 51, a holder mounting part 53, a first pair of protrusions 55, a second pair of protrusions 57, and a third pair of protrusions 59. The holder 39 is rotatably installed in the holder mounting part 53. In FIG. 9, only one of the protrusions 55, 57, and 59 is illustrated for the sake of clarity. The other protrusion among the protrusions 55, 57 and 59 is not visible in FIG. 9.

Each of the first pair of protrusions 55 is formed in a rectangular parallelepiped shape and protrudes from both ends in the width direction WD of the housing body 51. Each end surface (two end surfaces) 61 of each of the first pair of protrusions 55 in the width direction is formed in a rectangular shape. An end surface 61 in the width direction of the first pair of protrusions 55 is a plane orthogonal to the width direction WD.

One end surface (first end surface) 61 of the two end surfaces in the width direction of the first pair of protrusions 55 constitutes the widthwise first portion 19, and the other end surface (second end surface) 61 of the two end surfaces in the width direction of the first pair of protrusions 55 constitutes the widthwise second position 21 in the width direction.

Each of the second pair of protrusions 57 is also formed in a rectangular parallelepiped shape and protrudes from both ends in the width direction of the housing body 51. Each of the second pair of protrusions 57 is positioned below each of the first pair of protrusions 55 in the vertical direction VT and is in contact with each of the first pair of protrusions 55.

Each of the end surfaces (two end surfaces) 63 on the back side in the thickness direction of each of the second pair of protrusions 57 is formed in a rectangular shape. End surfaces 63 on the back side in the thickness direction of the second pair of protrusions 57 are flat surfaces orthogonal to the thickness direction. The end surfaces 63 of the second pair of protrusions 57 on the back side in the thickness direction constitute the thickness-direction first portion 15 in the thickness direction.

Each of the front end surfaces (two end surfaces) 65 in the thickness direction of each of the second pair of protrusions 57 is also formed in a rectangular shape. The end surface 65 on the front side in the thickness direction of the second pair of protrusions 57 is also a plane orthogonal to the thickness direction. The end surface 65 on the front side in the thickness direction of each of the second pair of protrusions 57 constitutes a thickness-direction second portion 17 in the thickness direction.

Each of the end surfaces (two end surfaces) 67 in the width direction of each of the second pair of protrusions 57 is formed in a rectangular shape. The end surfaces 67 of the second pair of protrusions 57 in the width direction are flat surfaces orthogonal to the width direction.

As described with reference to FIG. 5, these end surfaces 67 abut on the thickness-direction fixing portion 9 of the liquid level detector support 1 when the liquid level detector 3 is slightly inclined about an axis extending in the thickness direction with respect to the liquid level detector support 1.

The rotation angle of the liquid level detector 3 with respect to the liquid level detector support 1 is prevented from being larger than a predetermined slight angle.

Each of the third pair of protrusions 59 is also formed in a rectangular parallelepiped shape and protrudes from both ends in the width direction of the housing body 51. Each of the third pair of protrusions 59 is positioned below each of the second pair of protrusions 57 in the vertical direction VT, and is separated from each of the second pair of protrusions 57.

Each of the end surfaces (two end surfaces) 69 on the back side in the thickness direction of each of the third pair of protrusions 59 is also formed in a rectangular shape. The end surfaces 69 of the third pair of protrusions on the back side in the thickness direction are also flat surfaces orthogonal to the thickness direction. The end surface 69 of each of the third pair of protrusions 59 on the back side in the thickness direction also constitutes the first portion in the thickness-direction first portion 15.

Each of the end surfaces (two end surfaces) 71 on the front side in the thickness direction of each of the third pair of protrusions 59 is also formed in a rectangular shape. The end surface 71 on the front side in the thickness direction of the third pair of protrusions 59 is also a plane orthogonal to the thickness direction. The end surface 71 of each of the third pair of protrusions 59 on the front side in the thickness direction also constitutes the thickness-direction second portion 17 in the thickness direction.

Each of end surfaces (two end surfaces) 73 in the width direction of each of the third pair of protrusions 59 is also formed in a rectangular shape. The end surfaces 73 of the third pair of protrusions 59 in the width direction are also flat surfaces orthogonal to the width direction.

As described with reference to FIG. 5, these end surfaces 73 also come into contact with the fixing portion 9 in the thickness direction of the liquid level detector support 1 when the liquid level detector 3 is slightly inclined about an axis extending in the thickness direction with respect to the liquid level detector support 1. The rotation angle of the liquid level detector 3 with respect to the liquid level detector support 1 is prevented from being larger than a predetermined slight angle.

The liquid level detector support 1 includes the support body 7, the protrusions 27 and 29 of the thickness-direction fixing portion 9, the protrusion 25A constituting the first widthwise fixing portion 11, and the protrusion 25B constituting the second widthwise fixing portion 13 (See FIGS. 2, 6A-6D).

The support body 7 is generally formed in a flat plate shape, and its thickness direction coincides with the thickness direction of the liquid level detector support 1.

One protrusion 25A of the pair of protrusions 25 includes a rectangular plate-shaped base end part 75 and a rectangular plate-shaped distal end part 77. The thickness direction of the base end part 75 coincides with the thickness direction of the liquid level detector support 1. The base end part 75 extends from one end in the width direction of the support body 7 in a thrill in which the support body 7 is projected in the width direction as it is.

The thickness direction of the distal end part 77 coincides with the width direction of the liquid level detector support 1. The distal end part 77 extends from the distal end of the base end part 75 to the front side in the thickness direction of the liquid level detector support 1 in a form in which the base end part 75 is extended as it is. Further, when the protrusion 25A is viewed in the vertical direction VT, it has an "L" shape.

A cutout 23 (through-hole 33) provided in the protrusion 25A penetrates the base end part 75 and the distal end part 77 in the thickness direction thereof. A portion of the through-hole 33 provided in the base end part 75 and a portion of the through-hole 33 provided in the distal end part 77 communicates each other.

The through-hole 33 is provided over the entire length of the base end part 75 in the extending direction of the base end part 75, and is provided over the entire length of the distal end part 77 except for the distal end of the distal end part 77 in the extending direction of the distal end part 77. The through-hole 33 is positioned at the center of the base end part 75 and the distal end part 77 in the vertical direction VT.

Figure 3:
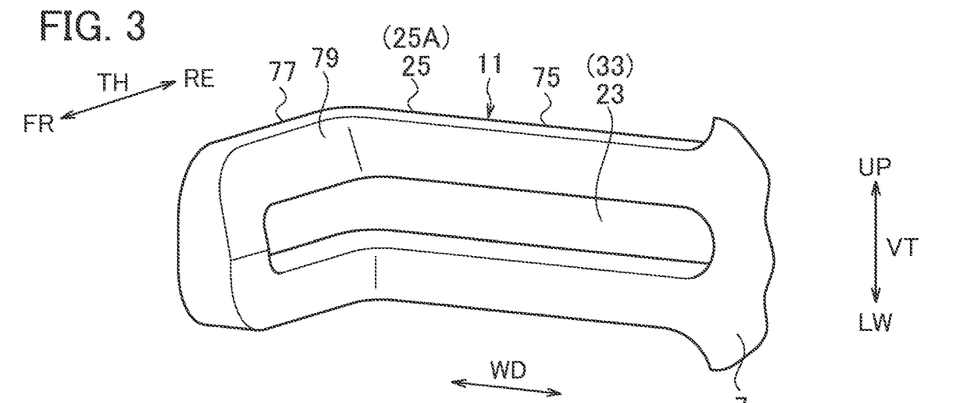
FIG. 3 is an enlarged view of part III in FIG. 2.

The distal end part 77 is provided with an inclined surface (guide surface) 79 configured to guide the housing 35 of the liquid level detector 3 when mounting the liquid level detector 3 onto the liquid level detector support 1 (see FIG. 3, etc.).

The other protrusion 25B of the pair of protrusions 25 is provided symmetrically with the one protrusion 25A with respect to the center plane of the liquid level detector support 1. The center plane of the liquid level detector support 1 is a plane orthogonal to the width direction and includes the center of the liquid level detector support 1.

When the liquid level detector 3 is mounted on the liquid level detector support 1, each of the distal end parts 77 of the protrusions 25 (25A, 25B) abuts on each of the first pair of protrusions 55 of the housing 35 of the liquid level detector 3. The liquid level detector 3 is positioned and fixed to the liquid level detector support 1 in the width direction.

One protrusion 27A of the pair of protrusions 27 is provided on the lower side of the protrusion 25A apart from the protrusion 25A. The protrusion 27A includes a rectangular plate-shaped base end part 81, a rectangular plate-shaped intermediate part 83, and a rectangular plate-shaped distal end part 85.

The thickness direction of the base end part 81 is coincident with the thickness direction of the liquid level detector support 1. The base end part 81 extends from one end in the width direction of the support body 7 in a form in which the support body 7 is projected in the width direction as it is. The thickness direction of the intermediate part 83 coincides with the width direction of the liquid level detector support 1. The intermediate part 83 extends from the tip of the base end part 81 to the front side in the thickness direction of the liquid level detector support 1 in a form in which the base end part 81 is extended as it is.

The thickness direction of the distal end part 85 coincides with the thickness direction of the liquid level detector support 1. The distal end part 85 extends from the distal end of the intermediate part 83 to the widthwise center side of the liquid level detector support 1 in a form in which the intermediate part 83 is extended as it is. Further, when the protrusion 27A is viewed in the vertical direction VT, it has a substantially "C" shape.

In the above description, the liquid level detector 3 is sandwiched between the distal end part 85 and the support body 7 in the thickness direction, and is fixed to the liquid level detector support 1. Here, the liquid level detector 3 may be sandwiched between the distal end part 85 and the base end part 81 in the thickness direction and fixed to the liquid level detector support 1. In this case, it is assumed that the base end part 81 is not a part of the protrusion 27A hut a part of the support body 7.

A cutout 23 (through-hole 31) provided in the protrusion 27A penetrates the base end part 81, the intermediate pan 83, and the distal end part 85 in the thickness direction thereof. A part of the through-hole 31 provided in the base end part 81, a pan of the through-hole 31 provided in the intermediate part 83, and a part of the through-bole 31 provided in the distal end part 85 communicates each other.

The through-hole 31 is provided over the entire length of the base end part 81 in the extending direction of the base end part 81, and is provided over the entire length of the intermediate pan 83 in the extending direction of the intermediate part 83. The through-hole 31 is provided over the entire length of the distal end part 85 except the distal end of the distal end part 85 in the extending direction of the distal end part 85. The through-hole 31 is positioned at the center of the base end part 81, the intermediate part 83, and the distal end pan 85 in the vertical direction VT.

As illustrated in FIGS. 6A-6D, the intermediate part 83 is provided with an inclined surface 87. The inclined surface 87 is a guide surface for guiding the housing 35 of the liquid level detector 3 when the liquid level detector 3 is mounted on the liquid level detector support 1. The distal end part 85 is also provided with an inclined surface (guide surface) 89 configured to the housing 35 of the liquid level detector 3 when mounting the liquid level detector 3 onto the liquid level detector support 1.

The other protrusion 27B of the pair of protrusions 27 is provided symmetrically with the one protrusion 27A with respect to the center plane of the liquid level detector support 1.

When the liquid level detector 3 is mounted on the liquid level detector support 1, each of the distal end parts 85 of the protrusions 27 (27A, 27B) abuts on each of the second pair of protrusions 57 of the housing 35 of the liquid level detector 3. The liquid level detector 3 is positioned and fixed to the liquid level detector support 1 in the thickness direction.

When the liquid level detector 3 is mounted on the liquid level detector support 1 and the liquid level detector 3 is slightly inclined with respect to the liquid level detector support 1, each of the pair of intermediate parts 83 abuts on each of the second pair of protrusions 57. The rotation angle of the liquid level detector 3 with respect to the liquid level detector support 1 is prevented from being larger than a predetermined slight angle.

One protrusion 29A of the pair of protrusions 29 is provided on the lower side of the protrusion 29A away from the protrusion 29A. The protrusion 29A, like the protrusion 27A, includes a rectangular plate-shaped base end part 91, a rectangular plate-shaped intermediate part 93, and a rectangular plate-shaped distal end part 95.

A cutout 23 (through-hole 31) provided in the protrusion 29A is also provided in the same manner as the cutout 23 (through-hole 31) provided in the protrusion 27A. The intermediate part 93 and the distal end part 95 are provided with guide surfaces 97 and 99 similar to guide surface 89 of the protrusion 27A.

The other protrusion 29B of the pair of protrusions 29 is provided symmetrically with the one protrusion 29A with respect to the center plane of the liquid level detector support 1.

When the liquid level detector 3 is installed on the liquid level detector support 1, each of the distal end parts 95 of the protrusions 29 (29A, 29B) abuts on each of the third pair of protrusions 59 of the housing 35 of the liquid level detector 3. The liquid level detector 3 is positioned and fixed to the liquid level detector support 1 in the thickness direction.

When the liquid level detector 3 is mounted on the liquid level detector support 1 and the liquid level detector 3 is slightly inclined with respect to the liquid level detector support 1, each of the pair of intermediate parts 93 abuts on each of the third pair of protrusions 59. The rotation angle of the liquid level detector 3 with respect to the liquid level detector support 1 is prevented from being larger than a predetermined slight angle.

The protective portion 45 of the liquid level detector support 1 comprises a pair of protrusions 101 (101A, 101B).

One protrusion 101A of the pair of protrusions 101 is provided on the lower side of the protrusion 29A apart from the protrusion 29A. The protrusion 101A includes a rectangular plate-shaped base end part 103 and a rectangular plate-shaped distal end part 105. One corner of the distal end part 105 is chamfered or has an inclined surface 107.

The thickness direction of the base end part 103 coincides with the thickness direction of the liquid level detector support 1. The base end part 103 extends from one end in the width direction of the support body 7 in a form in which the support body 7 is projected in the width direction as it is. The thickness direction of the distal end part. 105 coincides with the width direction of the liquid level detector support 1. The distal end part 105 extends from the distal end of the base end part 103 to the front side in the thickness direction of the liquid level detector support 1 in a form in which the base end part 103 is extended as it is.

Further, when the protrusion 101A is viewed in the vertical direction VT, it has an "L" shape. The inclined surface 107 is provided at a corner portion of the distal end part 105 located at a lower side in the vertical direction VT and at a front side (opposite side to the support body 7) in the thickness direction. The cutout (through-hole) provided in the protrusion 101A is provided in the same manner as the cutout 23 of the protrusion 25A.

The other protrusion 101B of the pair of protrusions 101 is provided symmetrically with the one protrusion 101A with respect to the center plane of the liquid level detector support 1.

In a state where the liquid level detector 3 is mounted on the liquid level detector support 1, the protrusion 101 is positioned below the liquid level detector 3 in the vertical direction VT apart from the liquid level detector 3.

Figure 4:
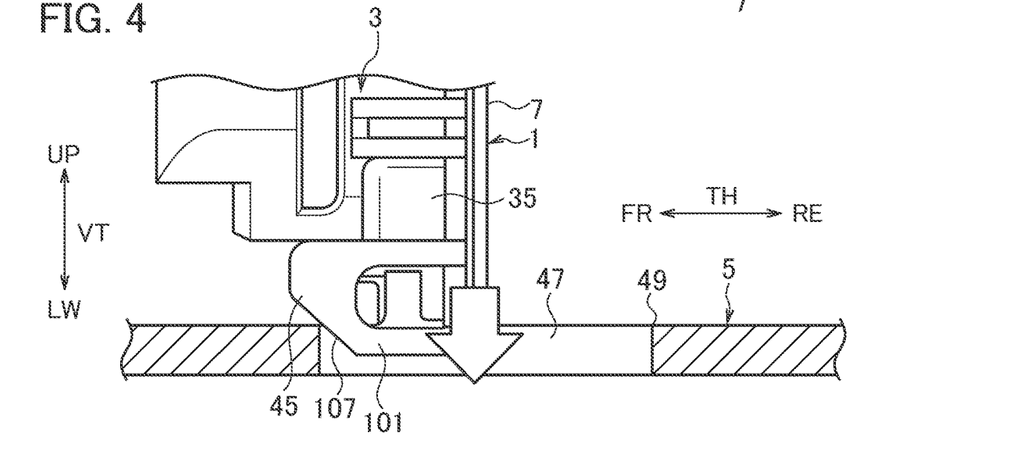
FIG. 4 is a diagram illustrating a state of installing a liquid level detector support made of metal according to some embodiments and a liquid level detector installed on the liquid level detector support into a fuel tank.

As illustrated in FIG. 4, when the liquid level detector support 1 having the liquid level detector 3 installed therein is installed in the tank 5, the protective portion 45 abuts against the opening part 47 of the tank 5, and the liquid level detector support 1 and the liquid level detector 3 are guided into the tank 5. This configuration prevents the liquid level detector 3 from directly colliding with the edge 49 of the opening part 47 of the tank 5. Further, the protective portion 45 is tapered to form an inclined plane 107. Thus, even when the liquid level detector support 1 contacts the edge 49 or the like of the opening part 47, the liquid level detector support 1 does not easily get caught, and the insertability of the liquid level detector support 1, to which the liquid level detector 3 is mounted, into the tank 5 is not inhibited.

Next, mounting of the liquid level detector 3 onto the liquid level detector support 1 will be described.

In the initial state, unlike the state illustrated in FIG. 1, the liquid level detector 3 is located above the liquid level detector support 1 apart from the liquid level detector support 1.

As illustrated in FIG. 1, the liquid level detector 3 is integrally mounted on the liquid level detector support 1 by moving the liquid level detector 3 downward relative to the liquid level detector support 1 from the initial state.

In the state illustrated in FIG. 1, the liquid level detector 3 is in contact with a stopper provided on the liquid level detector support 1. In the state illustrated in FIG. 1, the liquid level detector 3 cannot move further downward relative to the liquid level detector support 1. The protective portion 45 may be used as the stopper.

Next, the installation of the liquid level detector support 1 having the liquid level detector 3 in the tank 5 will be described.

In the initial state, unlike the state illustrated in FIG. 4, the liquid level detector support 1 in which the liquid level detector 3 is mounted is located above the tank 5 apart from the tank 5.

From the initial state, the liquid level detector support 1 on which the liquid level detector 3 is mounted is moved downward relative to the tank 5, so that the state illustrated in FIG. 4 is attained. Further, the liquid level detector 3 and the lower portion of the liquid level detector support 1 enter the tank 5 by moving the liquid level detector support 1 in which the liquid level detector 3 is mounted downward as indicated by an arrow in FIG. 4.

Thereafter, a portion to be installed (not illustrated) provided on the upper portion of the liquid level detector support 1 is installed in an installation portion (not illustrated) provided on the tank 5. As a result, the liquid level detector support 1 on which the liquid level detector 3 is mounted is installed in the tank 5.

In the liquid level detector support (support structure of the liquid level detector) 1, the liquid level detector 3 is supported in the thickness direction by the support body 7 and the thickness direction fixing portion 9. The liquid level detector 3 is supported in the width direction by the first widthwise fixing portion 11 and the second widthwise fixing portion 13 which are provided separately from the thickness-direction fixing portion 9. As a result, it is possible to achieve both an improvement in assemblability when assembling the liquid level detector 3 and an assurance of fixing strength when the liquid level detector 3 is assembled.

That is, when the liquid level detector 3 is mounted on the liquid level detector support 1, the liquid level detector 3 is fixed to the liquid level detector support 1 at, for example, separate locations. Thus, the force required for assembling the liquid level detector 3 can be dispersed to some extent and reduced. Therefore, the assembling property when assembling the liquid level detector 3 can be improved. When the liquid level detector 3 is attached to the liquid level detector support 1 by a human hand, the assembling property is improved, and a process failure such as half-fitting is prevented from occurring.

The liquid level detector 3 is fixed to the liquid level detector support 1 in the width direction, and the liquid level detector 3 is fixed to the liquid level detector support in the thickness direction. For this reason, the fixing strength at the time when the liquid level detector is assembled is secured.

Figure 10:
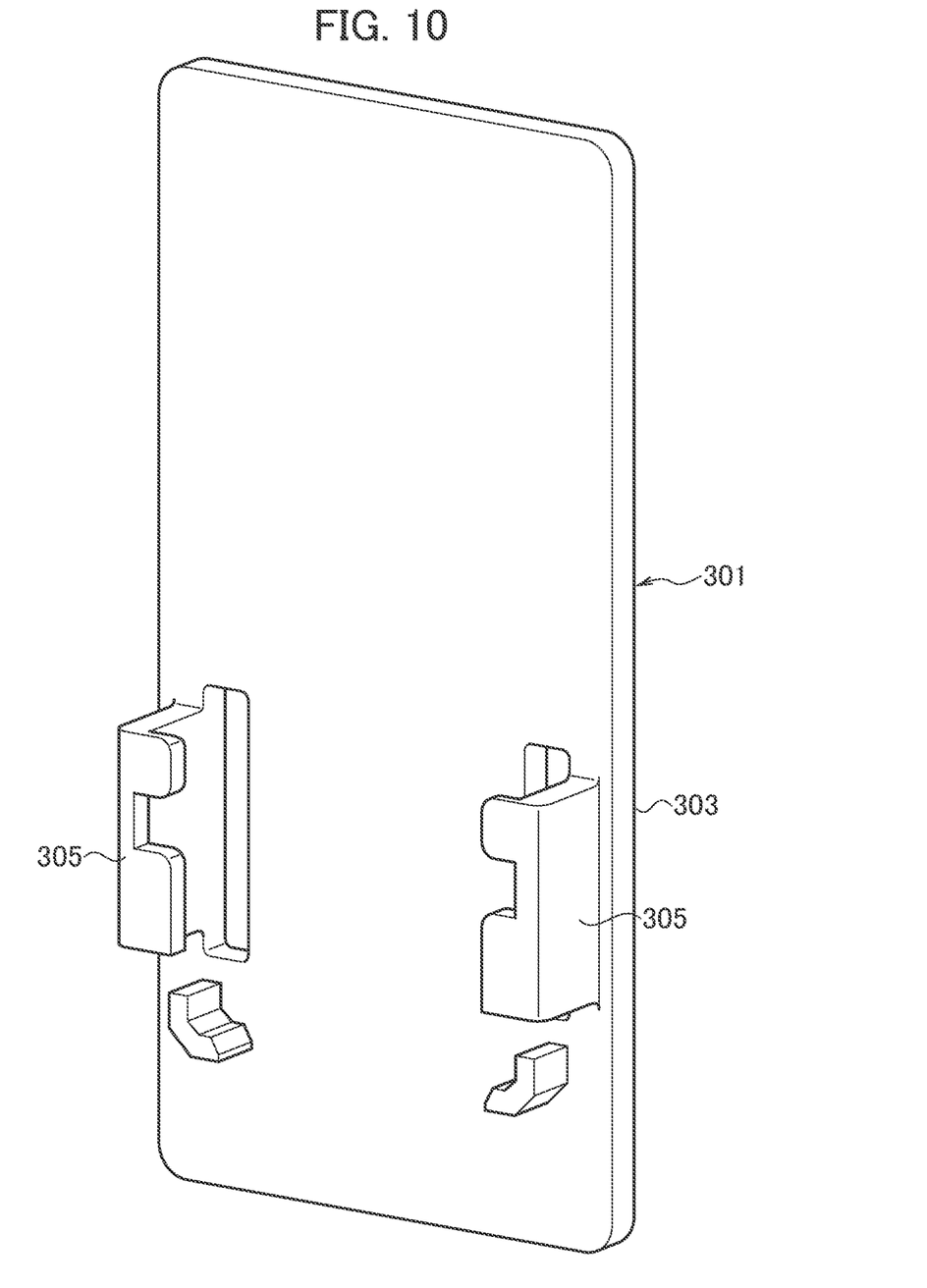
FIG. 10 is a perspective view of a liquid level detector support made of metal according to a comparative example.
Figure 11:
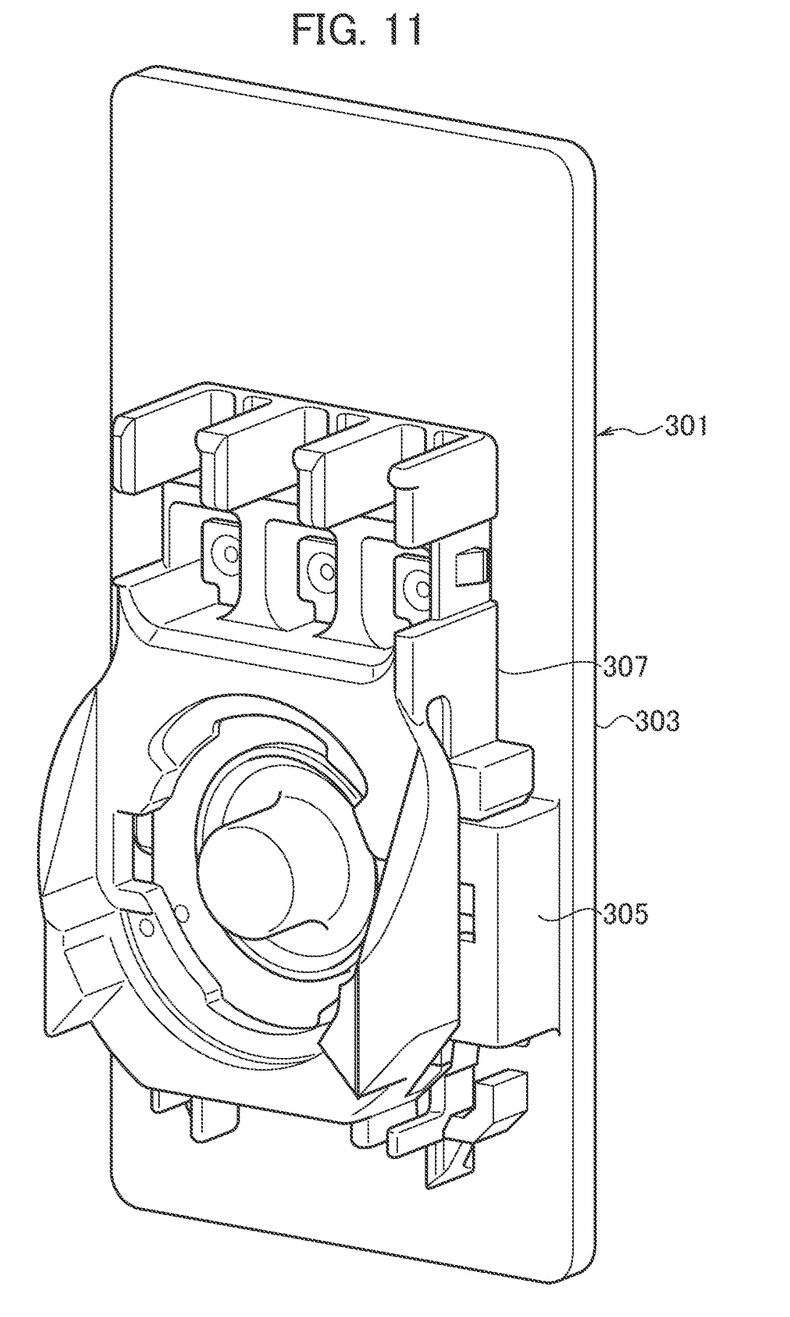
FIG. 11 is a perspective view 11 of a liquid level detector support made of metal according to a comparative example and a housing of a liquid level detector mounted on the liquid level detector support.

On the other hand, as illustrated in FIGS. 10 and 11, the liquid level detector support (metal mounting stay) 301 of the comparative example includes a support body 303 and a pair of protrusions 305 provided on the support body 303. The metal mounting stay 301 simultaneously sandwiches the liquid level detector 307 in the width direction and the thickness direction by the support body 303 and the pair of protrusions 305. Thus, the liquid level detector 307 is mounted on the metal mounting stay 301 without rattling.

Figure 12:
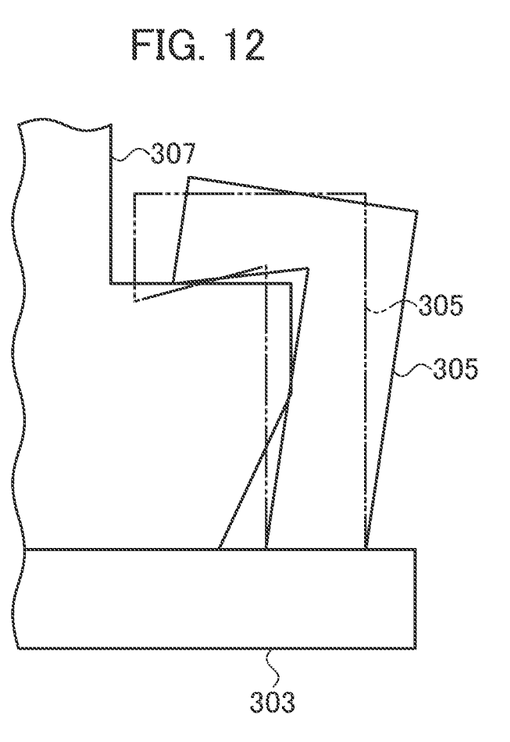
FIG. 12 is a diagram illustrating a behavior of a liquid level detector support made of metal according to a comparative example in which a liquid level detector is mounted.

However, since the metal mounting stay is made of metal, the metal mounting stay 301 has high rigidity. Furthermore, the mounting load of the liquid level detector 307 is increased. For this reason, the metal mounting stay 301 has been impaired in its ease of assembly. For example, in the case where the liquid level detector 307 is installed on the metal mounting stay 301, as illustrated in FIG. 12, it is necessary to bend the metal protrusion 305 from the state illustrated by the dashed-and-two dotted line to the state illustrated by the solid line. As a result, the ease of assembly has been impaired.

Further, in order to improve the assemblability, it is conceivable that the liquid level detector 307 is installed with some rattling to the metal mounting stay 301. With this raffling, the value of the force applied when the liquid level detector 307 is installed on the metal mounting stay 301 can be reduced. However, if the liquid level detector 307 is made to have looseness, the detection accuracy of the liquid level detector deteriorates.

Since the liquid level detector support 1 of the embodiment is formed into a simple structure by bending, processing is facilitated. Further, since the thickness-direction fixing portion 9, the first widthwise fixing portion 11, and the second widthwise fixing portion 13 stand in parallel with the insertion direction (vertical direction VT) of the liquid level detector 3 into the liquid level detector support 1, the liquid level detector support 1 is also excellent in proof stress against a load received from the insertion direction.

That is, the thickness directions of the base end part 75 and the distal end part 77 of the protrusion portion 25 of the thickness direction fixing portion 9 are orthogonal to the vertical direction VT. Thus, the rigidity (rigidity against the vertical load) of the thickness-direction fixing portion 9 when mounting the liquid level detector 3 onto the liquid level detector support 1 is increased. The rigidity of the first widthwise fixing portion 11 and the second widthwise fixing portion 13 is also increased.

In the liquid level detector support 1, cutouts 23 are formed in the thickness direction fixing portion 9, the first widthwise fixing portion 11, and the second widthwise fixing portion 13. Thus, the rigidity of each of the thickness-direction fixing portion 9, the first widthwise fixing portion 11, and the second widthwise fixing portion 13 can be adjusted to facilitate bending. Thus, it is possible to improve the assembling property when assembling the liquid level detector 3 and to secure the fixing strength when the liquid level detector 3 is assembled.

In addition, in a state where the liquid level detector 3 is fixed to the liquid level detector support 1 by the first widthwise fixing portion 11 and the second widthwise fixing portion 13, if the fixing strength is slightly weak, the liquid level detector 3 may slightly tilt in the width direction. However, the liquid level detector support 1 is configured such that when the liquid level detector 3 is inclined at a predetermined slight angle in the width direction, the thickness direction fixing portion 9 abuts against the liquid level detector 3. Thus, even if the fixing strength of the first widthwise fixing portion 11 and the second widthwise fixing portion 13 is slightly weak, the liquid level detector 3 is fixed to the metal liquid level detector support 1. The deterioration of the detection accuracy of the position on the liquid level in the liquid level detector 3 is prevented.

In the liquid level detector support 1, the widthwise fixing portions 11 and 13 are formed of a pair of protrusions 25 (25A, 25B) projecting from the support body 7 toward both sides in the width direction. The thickness-direction fixing part 9 includes two pairs of protrusions 27 (27A, 27B) and 29 (29A, 29B) projecting from the support body 7 to both sides in the width direction.

Since the widthwise fixing portions 11 and 13 are formed of a pair of protrusions 25 (25A, 25B), when an external force inclined in the width direction is applied to the liquid level detector 3, there is a possibility that a slight inclination is generated in the liquid level detector 3. However, when the liquid level detector 3 is inclined at a predetermined slight angle in the width direction, the thickness-direction fixing portion 9 abuts on the liquid level detector 3. Therefore, the thickness-direction fixing portion 9 also plays a role of preventing the deterioration of the detection accuracy of the liquid level position of the liquid level detector 3.

In the liquid level detector support 1, the cutout 23 in the thickness direction fixing portion 9, the cutout 23 in the first widthwise fixing portion 11, and the cutout 23 in the second widthwise fixing portion 13 are formed of through-holes 31, 33. Thus, the rigidity of the thickness-direction fixing portion 9, the first widthwise fixing portion 11, and the second widthwise fixing portion 13 can be easily adjusted to be appropriate while enhancing the durability thereof.

In the liquid level detector support 1, the rotation shaft C1 of the holder 39 with respect to the housing 35 of the liquid level detector 3 is positioned in the center between the right and left protrusions 27, 29 of the thickness-direction fixing portion 9 in the width direction as viewed in the thickness direction of the support body 7. In the liquid level detector support 1, the rotation shaft C1 of the holder 39 with respect to the housing 35 is positioned in the center between the upper and lower protrusions 25, 27 of the thickness-direction fixing portion 9 in the vertical direction VT as viewed in the thickness direction of the support body 7. Thus, the liquid level detector 3 can be supported in a stable state.

A protective wall 45 configured to prevent the liquid level detector 3 from colliding with the edge 49 of the opening part 47 of the tank 5 when the liquid level detector support 1 is installed in the tank 5 is provided on the support body 7. Thus, the liquid level detector 3 can be protected at the time of inserting into the tank 5 even when the metal liquid level detector support 1 in which the liquid level detector 3 is mounted is inserted into the tank 5 and the liquid level detector 3 is installed in the tank 5.

In the embodiment illustrated in FIG. 2 and the like, the widthwise fixing portions 11 and 13 and the thickness-direction fixing portion 9 are arranged in this order from the upper UP side to the lower LW side. That is, the pair of protrusions 25 (25A, 25B), the pair of protrusions 27 (27A, 27B), and the pair of protrusions 29 (29A, 29B) are arranged in this order from the upper UP side to the lower LW side. Here, the arrangement order of the pair of protrusions 25, 27, 29 in the vertical direction VT may be changed appropriately.

For example, the thickness-direction fixing portions 9 (Pair of protrusions 27A, 27B), the widthwise fixing portions 11 and 13 (Pair of protrusions 25A, 25B), and the thickness-direction fixing portions 9 (Pair of protrusions 29A, 29B) may be arranged in this order from the upper UP side to the lower LW side.

The thickness-direction fixing portions 9 (Pair of protrusions 27A, 27B), the thickness-direction fixing, portions 9 (Pair of protrusions 29A, 29B), and the width-direction fixing portions 11, 13 (Pair of protrusions 25A, 25B) may be arranged in this order from the upper UP side to the lower LW side.

Further, the liquid level detector support 1 may have a shape orthogonal to the width direction and asymmetric with respect to the center plane of the liquid level detector support 1. In particular, the thickness-direction fixing portion 9 may have an asymmetric shape. For example, a pair of the thickness-direction fixing portions 9 may be provided at positions shifted in the vertical direction VT.

That is, the distal end part 85 of the protrusion 27B illustrated in FIG. 2 may be deleted, and the distal end part 95 of the protrusion 29A illustrated in FIG. 2 may be deleted. Alternatively, the distal end part 85 of the protrusion 27A illustrated in FIG. 2 may be omitted, and the distal end part 95 of the protrusion 29B illustrated in FIG. 2 may be omitted. With this structure, the value of the force required to mount the liquid level detector 3 on the liquid level detector support 1 by press-fining can be reduced. That is, the value of the assembling load of the liquid level detector 3 to the liquid level detector support 1 is reduced, and the liquid level detector 3 can be easily mounted to the liquid level detector support 1.

Next, a metal liquid level detector support 1a according to a modification will be described with reference to FIG. 7.

In the liquid level detector support 1a made of metal according to the modification, the widthwise fixing portions 11 and 13 are formed of two pairs of protrusions 25 (25A, 25B, 25C, 25D), which is different from the liquid level detector support 1 according to some embodiments of the present disclosure. The metal liquid level detector support 1a according to the modification is formed in the same manner as the liquid level detector support 1 according to some embodiments of the present disclosure in other respects.

Figure 7:
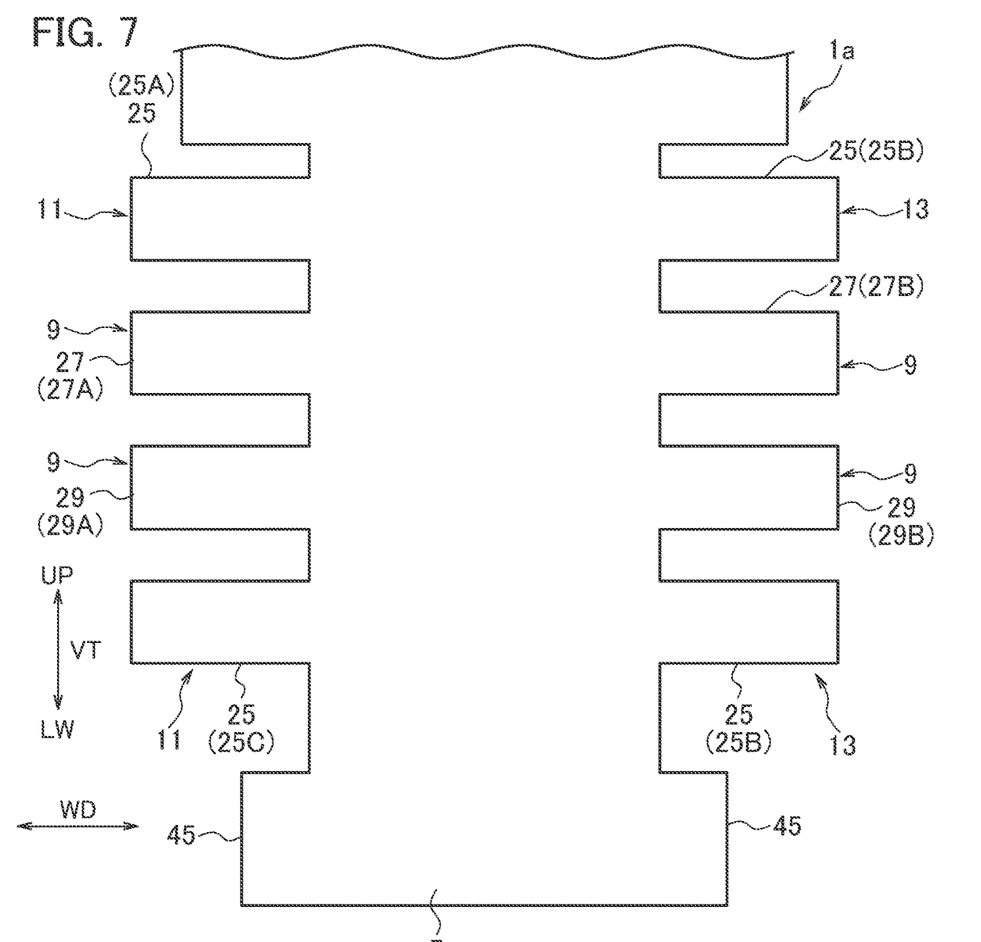
FIG. 7 is a front view of a liquid level detector support made of metal according to a modification.

In the liquid level detector support 1a illustrated in FIG. 7, the pair of protrusions 25A and 25B, the pair of protrusions 27A and 27B, the pair of protrusions 29A and 29B, and the pair of protrusions 25C and 25D are arranged in this order from the upper UP side to the lower LW side. Here, the arrangement order of the protrusions 25, 27 and 29 in the vertical direction VT may be appropriately changed in the same manner as the liquid level detector support 1 illustrated in FIG. 2 and the like.

Figures 8A, 8B:
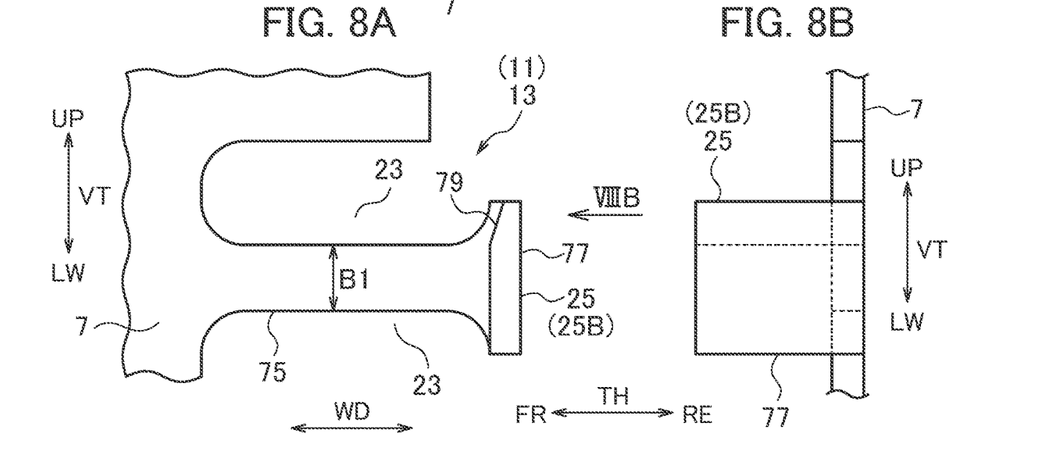
FIG. 8A is a view corresponding to the VIIIA part in FIG. 6A and illustrating a widthwise fixing portion (second widthwise fixing part) of a liquid level detector support made of metal according to a modification.
FIG. 8B is an arrow view of VIIIB in FIG. 8A.

In the liquid level detector support 1 illustrated in FIG. 2 and the like, the cutouts 23 provided in the fixing portions 9, 11, and 13 are formed by the through-holes 31 and 33, but as illustrated in FIGS. 8A and 8B, the cutouts 23 may be provided in order to reduce the value of the width B1 of the protrusion 25. Cutouts 23 may be provided in the protrusions 27 and 29 in a similar manner.

The liquid level detector supports 1 and 1a are examples of metal liquid level detector supports having a support body, a thickness-direction fixing portion, and a widthwise fixing portion. The thickness-direction fixing portion is provided in the support body, and the liquid level detector is fixed to the support body in the thickness direction. The widthwise fixing portion is provided on the support body separately from the thickness-direction fixing portion, and the liquid level detector is fixed to the support body in the widthwise direction.

According to the liquid level detector support, since the thickness direction fixing portion and the widthwise fixing portion are separately provided, it is possible to achieve both improvement in the assembling property when assembling the liquid level detector to the liquid level detector support and securing of the fixing strength when the liquid level detector is assembled to liquid level detector support.

The liquid level detector supports 1 and 1a are examples of a liquid level detector support having a support body and a fixing part provided on the support body for fixing the liquid level detector to the support body and provided with a cutout. The cutout is formed to adjust the rigidity of the fixing part by reducing the rigidity.

In the liquid level detector support, a cutout is provided in a fixing portion for fixing the liquid level detector to the support body. As a result, as described above, it is possible to improve the assembling property when assembling the liquid level detector to the liquid level detector support and to secure the fixing strength when the liquid level detector is assembled to the liquid level detector support.

While certain embodiments have been described, these embodiments have been presented by way of example only, and are not intended to limit the scope of the inventions. Indeed, the novel embodiments described herein may be embodied in a variety of other firms; furthermore, various omissions, contributions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid-level-detector support made of metal comprising:
    a support body configured to engage with a thickness-direction first portion arranged on a first side in the thickness direction of a liquid level detector;
    a thickness-direction fixing portion projecting from the support body and configured to engage with a thickness-direction second portion arranged on a second side in the thickness direction of the liquid level detector, thereby configured to fix the liquid level detector in the thickness direction in cooperation with the support body;
    a first widthwise-fixing portion projecting from the support body apart from the thickness-direction fixing portion and configured to engage with a widthwise first portion arranged on a first side in the widthwise direction of the liquid level detector; and
    a second widthwise-fixing portion projecting from the support body apart from the thickness-direction fixing portion and arranged on the opposite side with respect to the first widthwise fixing portion and configured to engage with a widthwise second portion arranged on a second side in the widthwise direction of the liquid level detector, thereby configured to fix the liquid level detector in the widthwise direction in cooperation with the first widthwise-fixing portion.

2. The liquid-level-detector support made of metal according to claim 1, wherein at least one of the thickness-direction fixing portion, the first widthwise-fixing portion, and the second widthwise-fixing portion has a cutout formed therein.

3. The liquid-level-detector support made of metal according to claim 1, wherein the thickness-direction fixing portion is configured to abut on the liquid level detector in a state the liquid level detector is fixed by the first widthwise-fixing portion and the second widthwise-fixing portion and when the liquid level detector is inclined at a predetermined angle in the width direction.

4. The liquid-level-detector support made of metal according to claim 1, wherein the support body is provided with a protective portion configured to prevent the liquid level detector from colliding with an edge of an opening part of a tank when installing the liquid level detector into the tank.

* * * * *